(12) United States Patent
Cassaignon et al.

(10) Patent No.: US 7,731,934 B2
(45) Date of Patent: Jun. 8, 2010

(54) TITANIUM OXIDE WITH A RUTILE STRUCTURE

(75) Inventors: Sophie Cassaignon, Antony (FR); Jean-Pierre Jolivet, Vaugrigneuse (FR); Magali Koelsch, Paris (FR)

(73) Assignees: Universite Pierre et Marie Curie, Paris (FR); Centre National de la Recherche Scientifique, Paris (FR)

( * ) Notice: Subject to any disclaimer, the term of this patent is extended or adjusted under 35 U.S.C. 154(b) by 541 days.

(21) Appl. No.: 11/632,778

(22) PCT Filed: Jul. 12, 2005

(86) PCT No.: PCT/FR2005/001795

§ 371 (c)(1),
(2), (4) Date: Jul. 20, 2007

(87) PCT Pub. No.: WO2006/018492

PCT Pub. Date: Feb. 23, 2006

(65) Prior Publication Data

US 2007/0277872 A1   Dec. 6, 2007

(30) Foreign Application Priority Data

Jul. 19, 2004   (FR) .................................. 04 07969

(51) Int. Cl.
*C01G 1/00* (2006.01)
(52) U.S. Cl. ........................... 423/611; 423/80; 423/85; 423/274; 423/610; 427/161; 427/165; 977/811; 136/254; 136/263; 252/182.1; 428/432; 428/702
(58) Field of Classification Search .................. 423/80, 423/85, 274, 610, 611; 427/161, 165; 977/811; 136/254, 263; 252/182.1; 428/432, 702
See application file for complete search history.

(56) References Cited

U.S. PATENT DOCUMENTS

| | | | |
|---|---|---|---|
| 3,018,186 A | 1/1962 | Jenkins | |
| 7,232,556 B2 * | 6/2007 | Yadav | ..................... 423/592.1 |
| 7,438,948 B2 * | 10/2008 | Harris et al. | ................. 427/166 |

FOREIGN PATENT DOCUMENTS

| | | |
|---|---|---|
| EP | 56155098 | 1/1981 |
| EP | 1400491 | 3/2004 |
| WO | 91/16719 | * 10/1991 |

OTHER PUBLICATIONS

M. Koelsch et al., "Comparison of Optical and Electrochemical Properties of Anatase and Brookite $TiO_2$ Synthesized by the Sol-Gel Method", Thin Solid Films, vol. 403-404, pp. 312-319, (2002).
T. Sasaki et al., "Fabrication of Titanium Dioxide Thin Flakes and Their Porous Aggregate", Chemistry of Materials, American Chemical Society, vol. 9, No. 2, pp. 602-608, (1997).
M. Koelsch et al., "Electrochemical Comparative Study of Titania (Anatase, Brookite and Rutile) Nanoparticles Synthesized in Aqueous Medium", vol. 451-452, pp. 86-92, (2004).
International Search Report mailed Dec. 23, 2005.

* cited by examiner

*Primary Examiner*—Steven Bos
(74) *Attorney, Agent, or Firm*—Merchant & Gould

(57) ABSTRACT

The invention relates to a novel form of titanium oxide.

The titanium oxide is characterized in that it has the crystallographic structure of rutile with an orthorhombic lattice and a Pnmm space group, it has a platelet morphology, the platelets being of rectangular shape with a length between 3 and 10 nm, a width between 3 and 10 nm and a thickness of less than 1 nm and it has a specific surface area, determined by nitrogen adsorption/desorption, of 100 to 200 $m^2/g$.
Applications: self-cleaning glazing, photovoltaic cells.

11 Claims, 2 Drawing Sheets

US 7,731,934 B2

TITANIUM OXIDE WITH A RUTILE STRUCTURE

The present invention relates to a novel form of titanium oxide and to a method for preparing it.

BACKGROUND OF THE INVENTION

Titanium oxide is a compound widely used in various industrial fields. The uses are varied, and they depend in particular on its crystallographic structure and its morphology.

Various methods of preparation are known in the prior art. Preparation via a hydrothermal route has been widely explored, but its main drawback lies in the relatively high temperatures and pressures that are required. This is because rutile is the thermodynamically stable phase and its formation requires hard conditions, that is to say acid media, high temperatures and/or long aging times. These hydrothermal syntheses consist in heating, between 140° C. and 1200° C., a precursor such as $TiCl_4$ (H. Yin, Y. Wada, T. Kitamura, S. Kambe, S. Murasawa, H. Mori, T. Sakata, J. Mater. Chem., 2001, 11, 1694) or $Ti(OiPr)_4$ in aqueous medium (C. C. Wang, J. Y. Ying, Chem. Mater., 1999, 11, 3113) or an organic (alcoholic) precursor (S. T. Aruna, S. Tirosh, A. Zaban, J. Mater. Chem., 2000, 10, 2388) in the presence of other reactants (acids, complexing agents, salts, etc.). The particles obtained are generally elongate and their size is of the order of 100 nm. The addition of mineralizing agents (for example NaCl, $NH_4Cl$ or $SnCl_4$) has the effect of reducing the size of the rutile particles (H. Cheng, J. Ma, Z. Zhao, L. Qi, Chem. Mater., 1995, 7, 663).

Titanium oxides have also been prepared by hydrolyzing a $Ti^{IV}$ compound in aqueous medium at temperatures below 100° C., but the compounds obtained are anisotropic (S. Yin, H, Hasegawa, T. Sato, Chem. Lett., 2002. 564).

It is also possible to obtain $TiO_2$ by electrochemical synthesis, but the synthesis conditions are demanding and the morphology of the compound obtained is difficult to control.

The hydrolysis of various precursors has also been used for the preparation of $TiO_2$. For example, $TiO_2$ is obtained in brookite form from an aqueous $TiCl_3$ solution at a pH below 5 (B. Othani, et al., Chem. Phys. Lett., 1995, 120(3), 292). $TiO_2$ is obtained in the form of a mixture of rutile, brookite, $Ti_6O_{11}$ and $Ti_7O_{13}$ by hydrolysis of an aqueous $TiCl_3$ solution that contains urea, the pH of the solution thus being returned toward basic pH values as the urea decomposes (A. Ookubo, et al. J. Mater. Sci., 1989, 24, 3599). The preparation of $TiO_2$ in rutile form by direct oxidation of $TiCl_3$ at room temperature is described by F. Pedraza, et al. (Phys. Chem. Solids, 1999, 60(4), 445). The method consists either in leaving $TiCl_3$ in water for a certain time (for example 60 hours), in order to hydrolyze the $TiCl_3$ to $TiO_2$, or in heating the aqueous $TiCl_3$ solution to 80° C., then in filtering the particles formed and in drying them at 120° C. or higher. According to J. Sun, et al. (Huazue Xeubo, 2002, 60(8), 1524), a rutile nanopowder is obtained by direct hydrolysis of $TiCl_3$ solutions under mild conditions, in the presence of $(CH_3)_4NOH$ acting as precipitating agent. The rutile particles are in the form of needles. According to M. Koelsch, et al., (Thin Solid Films, 2004, 86-92, 451-542), the three $TiO_2$ polymorphs may be synthesized by thermolysis of $TiCl_4$ or $TiCl_3$ in aqueous medium, and by controlling the precipitation conditions (acidity, the nature of the anions, ionic force, titanium concentration, etc.) it is possible to control the crystal structure, the size and the morphology of the particles. Thus, spheroidal nanoanatase, pure brookite platelets, of nanoscale dimensions, and rutile of different forms may be obtained. The particular cases illustrated result in the formation of particles of spherical anatase, rutile with a rod or needle morphology, the rods or needles being of various sizes, and platelets of pure brookite. The hydrolysis of $TiCl_4$ in water at a temperature between 20 and 95° C. and an aging time of longer than two days results in rutile (Li, Y. Fan, Y. Chen, J. Mater. Chem., 2002, 12, 1387). The hydrolysis of $Ti(iPr)_4$ in an HCl-acidified aqueous solution at a temperature between 25 and 200° C. results in rutile rods (S. Yin, H. Hasegawa, T. Sato, Chem. Lett., 2002, 564). The hydrolysis of $TiOCl_2$ in HCl or in water containing $NH_4OH$ at a temperature of 60° C. gives rutile (D. S. Seo, J. K. Lee, H. Kim, J. Cryst. Growth, 2001, 223, 298).

Thus, it is apparent that, for a given type of method, the particular processing conditions have a major effect on the crystallographic structure and the morphology of the titanium oxide obtained.

SUMMARY OF THE INVENTION

The inventors have now found that, under very specific processing conditions, a $TiCl_3$ hydrolysis method results in a novel form of titanium oxide. Consequently, the subject of the present invention is a titanium oxide and a method for preparing it.

BRIEF DESCRIPTION OF THE DRAWINGS

FIG. 5 shows the variation of the $V_{OC}$ obtained from a film of rutile with a rod morphology, which is sensitized under the same conditions as the film of rutile with a platelet morphology according to the invention.

FIG. 6 shows the variation of the $V_{OC}$ obtained from a film of anatase with a spherical morphology, which is sensitized under the same conditions as the film of rutile with a platelet morphology according to the invention.

DETAILED DESCRIPTION OF THE PREFERRED EMBODIMENTS

Figure 1:
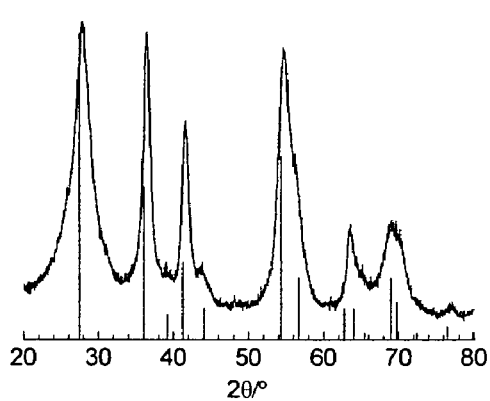
FIG. 1 shows the X-ray diffraction pattern for the compound obtained. The crystallographic parameters are: a=4.570(1) Å, b=4.674(1) Å and c=2.9390(5) Å. The length and the width of the platelets correspond to the [110] and [001] faces respectively.

The titanium oxide according to the present invention has the following characteristics:
- it has the crystallographic structure of rutile with an orthorhombic lattice and a Pnmm space group;
- it has a platelet morphology, the platelets being of rectangular shape with a length between 3 and 10 nm, a width between 3 and 10 nm and a thickness of less than 1 nm; and
- it has a specific surface area, determined by nitrogen adsorption/desorption, of 100 to 300 $m^2/g$.

The titanium oxide according to the invention may be obtained by a method consisting in preparing an aqueous $TiCl_3$ solution having a $TiCl_3$ concentration, for example of 0.15 mol/l, the pH of which is 3.5, in raising the reaction mixture to a temperature of 60° C.±3° C., in leaving it to mature for 24 hours and then in centrifugally separating the precipitate obtained.

The initial aqueous TiCl₃ solution may be brought to the desired pH by addition of an appropriate amount of a base, for example an alkali metal hydroxide (in particular NaOH and KOH), NH₄OH or NH₃.

In one particular embodiment, the precipitate obtained after centrifugation is rinsed using an aqueous acid solution, recentrifuged, rinsed again using distilled water and then dried.

The 1$^{st}$ rinsing is preferably carried out using an aqueous acid solution, for example an HCl, HNO₃ or HClO₄ solution, having an acid concentration of up to 3 mol/l.

The final drying may be carried out in an oven or in a stream of nitrogen.

The platelet morphology of the rutile according to the invention has an incontestable advantage in the formation of coatings for various substrates. Owing to their platelet morphology, the nanoscale rutile particles of the invention form coatings of higher quality than that obtained from particles in the form of spheres or rods. For example, rutile coatings of platelet morphology are more transparent and of higher coverage. Thus, the rutile of the present invention, with a platelet morphology, may be used in the production of self-cleaning glazing. Such glazing is obtained by depositing, using known techniques, a rutile film with a platelet morphology on a sheet of glass. It may also be used as a coating or as a constituent of a composition for the production of a UV filter, especially for sun creams, UV-resistant clothing, or as anti-yellowing agent.

Furthermore, the nanoscale platelet morphology of the rutile gives useful photoelectrochemical properties. The rutile according to the invention may consequently be used for the formation of a photosensitive film for the production of photovoltaic cells, such as those described for example in WO 91/16719. Such a cell comprises two electrodes, at least one of which is transparent, and means for passing an electric current, said electrodes being separated by at least one sheet of glass or of a transparent polymer, at least one layer of titanium oxide according to the invention being applied to said sheet after impregnation with a photosensitizing agent.

A photosensitive film may be obtained by forming a titanium oxide film from a concentrated aqueous solution and then by impregnating said film with a photosensitizing agent chosen, for example, from Ru, or Os complexes or complexes of a transition metal, such as for example Fe.

The invention is illustrated by the following examples.

Example 1

Added to 50 ml of distilled water were 4 ml of a commercial TiCl₃ (15%) solution in HCl. The pH of the solution was adjusted to 3.5 using sodium hydroxide. The TiCl₃ concentration of the solution thus obtained was 0.15 mol/l. This solution was then heated to 60° C. and maintained at this temperature for 24 h. The particles formed were then separated by centrifugation, washed with distilled water and then put back into aqueous solution with the addition of 100 ml of an aqueous HNO₃ solution of pH 2. The sol thus obtained was stable.

Some of the particles obtained after centrifugation were dried in a stream of nitrogen. The dry powder recovered was subjected to X-ray diffraction analysis. FIG. 1 shows the X-ray diffraction pattern for the compound obtained. The crystallographic parameters are: a=4.570(1) Å, b=4.674(1) Å and c=2.9390(5) Å. The length and the width of the platelets correspond to the [110] and [001] faces respectively.

Figure 2:
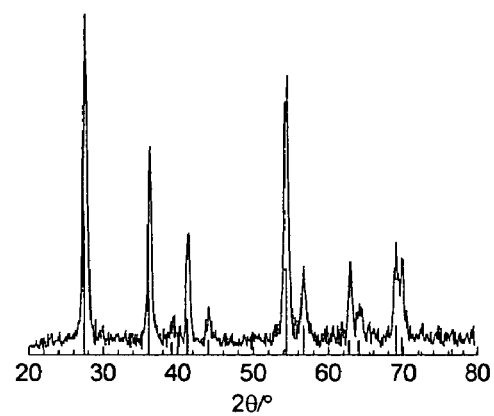
FIG. 2, given for comparison, shows the X-ray diffraction pattern of a rutile with a rod morphology of the prior art, which is characterized by a tetragonal lattice, a $P4_2/mnm$ space group and the following crystallographic parameters: a=4.5933 Å, b=4.5933 Å and c=2.9592 Å.

FIG. 2, given for comparison, shows the X-ray diffraction pattern of a rutile with a rod morphology of the prior art, which is characterized by a tetragonal lattice, a P4₂/mnm space group and the following crystallographic parameters: a=4.5933 Å, b=4.5933 Å and c=2.9592 Å.

Figure 3:
FIG. 3 shows a TEM micrograph of the product obtained.

FIG. 3 shows a TEM micrograph of the product obtained.

Example 2

Preparation of a Photosensitive Film of Platelet Rutile

A specimen of a 1 mol/l rutile solution, obtained by concentrating the sol prepared according to example 1, was deposited on a glass substrate made conducting by a fluorine-doped tin oxide coating. The film deposited was dried in an oven at 60° C. for a few minutes and then annealed at 450° C. for 30 min. It was checked that the annealing retained the crystal structure and the dimensions of the initial platelets. The annealed film obtained was porous and its surface was homogeneous. It had a thickness of 1-2 μm.

The film was immersed in a solution of a ruthenium bipyridyl derivative (sold by Solaronix under the name Ruthenium 535) in ethanol and kept in this solution in the dark for 24 hours. The film took on a dark red color.

The open-circuit potential $V_{OC}$ was measured in the following manner. The sensitized film, a mercurous sulfate reference electrode and a platinum counter electrode were immersed in a cuvette containing acetonitrile, potassium iodide (0.1 mol/l) and iodine. The film was illuminated by a lamp in the visible range and the $V_{OC}$ measured between the working electrode and the platinum electrode for various iodine concentrations. The potential of the platinum electrode $E_{Pt}$ was proportional to the iodine concentration in the solution, according to the equation:

$$E_{Pt} = E^0 + \frac{kT}{2q} \ln \frac{[I_3^-]}{[I^-]^3}.$$

Figure 4:
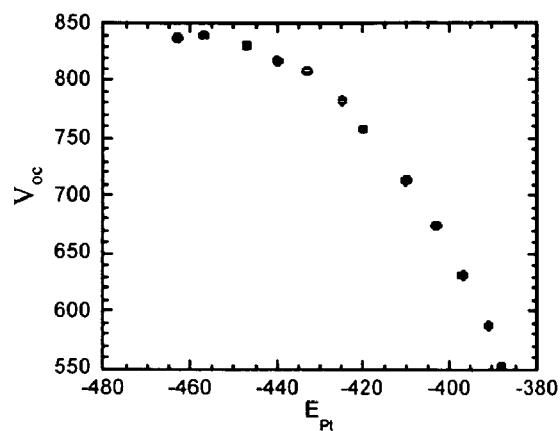
FIG. 4 shows the $V_{OC}$ (in mV) as a function of $E_{Pt}$ (in mV).
Figure 5:
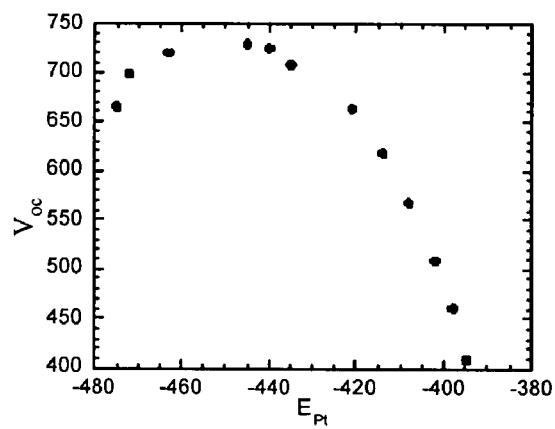
FIG. 5 is provided for comparison.
Figure 6:
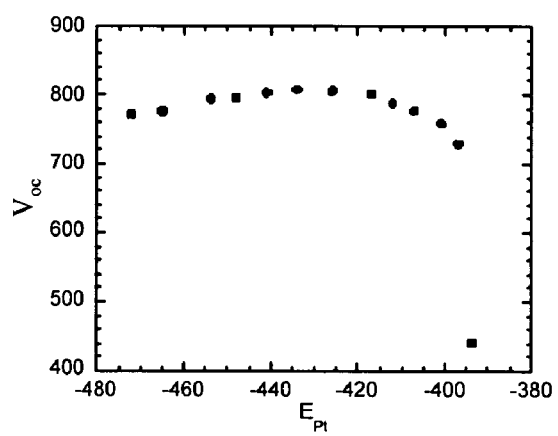
FIG. 6 is also provided for comparison.

FIG. 4 shows the $V_{OC}$ (in mV) as a function of $E_{Pt}$ (in mV) FIGS. 5 and 6 are given for comparison. They show the variation of the $V_{OC}$ obtained from a film of rutile with a rod morphology (FIG. 5) and from a film of anatase with a spherical morphology (FIG. 6) which are sensitized under the same conditions as the film of rutile with a platelet morphology according to the invention.

It is apparent that the $V_{OC}$ of the rutile with a platelet morphology is improved over the $V_{OC}$ of the rutile with a rod morphology and that it is approximately equivalent to the $V_{OC}$ of anatase, which is generally used for photosensitive films based on titanium oxide. However, because of their respective morphologies, a film of rutile with a platelet morphology has the advantage of greater covering power than that of a film of anatase with a spherical morphology.

The invention claimed is:
1. A titanium oxide comprising:
a crystallographic structure of rutile with an orthorhombic lattice and a Pnmm space group;
a platelet morphology, the platelets being of rectangular shape with a length between 3 and 10 nm, a width between 3 and 10 nm and a thickness of less than 1 nm; and a specific surface area, determined by nitrogen adsorption/desorption, of 100 to 300 m$^2$/g.

2. A method for preparing a titanium oxide as claimed in claim 1, comprising preparing an aqueous TiCl$_3$ solution having a TiCl$_3$ concentration of 0.15 mol/l, the pH of which is 3.5; raising the solution to a temperature of 60° C.; leaving the solution it to mature for 24 hours and then centrifugally separating the precipitate obtained.

3. The method as claimed in claim 2, wherein the pH of the aqueous TiCl$_3$ solution is adjusted by addition of a base.

4. The method as claimed in claim 3, wherein the base is NaOH, KOH, NH$_3$, or NH$_3$OH.

5. The method as claimed in claim 2, wherein the precipitate obtained after centrifugation is rinsed using an aqueous acid solution, recentrifuged, rinsed again using distilled water and then dried.

6. The method as claimed in claim 5, wherein the acid solution used for the rinsing is an aqueous HCl, HNO$_3$ or HClO$_4$ solution having an acid concentration of up to 3 mol/l.

7. The method as claimed in claim 5, wherein the drying is carried out in an oven or in a stream of nitrogen.

8. A photosensitive film comprising a titanium oxide as claimed in claim 1 and a photosensitive compound.

9. A method of producing a self-cleaning glass substrate comprising applying a coating of a titanium oxide as claimed in claim 1 to a glass substrate.

10. A photovoltaic cell comprising two electrodes, at least one of which is transparent, and means for passing an electric current, said electrodes being separated by at least one sheet of glass or of a transparent polymer, at least one titanium oxide film being applied to said sheet, wherein the titanium oxide is as claimed in claim 1, and is impregnated with a photosensitizing agent.

11. Self-cleaning glazing comprising a coating of a titanium oxide as claimed in claim 1.

* * * * *